United States Patent [19]

Sugawara

[11] Patent Number: 5,113,283
[45] Date of Patent: May 12, 1992

[54] OPTICAL INTENSITY MODULATOR

[75] Inventor: Mitsuru Sugawara, Sagamihara, Japan

[73] Assignee: Fujitsu, Kawasaki, Japan

[21] Appl. No.: 435,943

[22] Filed: Nov. 13, 1989

[30] Foreign Application Priority Data

Nov. 18, 1988 [JP] Japan .................... 63-290174

[51] Int. Cl.$^5$ .................... G02F 1/03; G02F 1/035; H01L 29/161; H01L 27/14
[52] U.S. Cl. .................... 359/248; 359/249; 359/276; 385/2; 357/16; 357/30
[58] Field of Search .................... 357/30, 16; 350/356, 350/96.14; 372/75, 26, 7; 385/2; 359/246, 248, 252, 249, 245, 276

[56] References Cited

U.S. PATENT DOCUMENTS

| 3,916,510 | 11/1975 | Martin | 357/60 |
| 4,731,641 | 3/1988 | Matsushima et al. | 357/30 A |
| 4,837,526 | 6/1989 | Suzuki et al. | 350/96.14 |
| 4,913,506 | 4/1990 | Suzuki et al. | 350/96.14 |
| 4,929,064 | 5/1990 | Schubert | 359/276 |

FOREIGN PATENT DOCUMENTS

3715071  11/1987  Fed. Rep. of Germany .

OTHER PUBLICATIONS

"Bipolar Semiconductor Devices", by David J. Roulston, McGraw-Hill Publishing Company, N.Y. © 1990 Chapter 2, Sec. 2.2.2, pp. 28-29.
Temkin et al., "InGaAsP/InP Quantum Well Modulators Grown by Gas Source Molecular Beam Epitaxy", Applied Physics Letters, vol. 50, No. 25, Jun. 1987, pp. 1776-1778.
Fujiwara et al., "Gigahertz-Bandwidth InGaAsP/InP Optical Modulators/Switches with Double-Hetero Waveguides", Electronics Letters, vol. 20, No. 19, Sep. 1984, pp. 790-792.
Noda et al., "High-Speed Electroabsorption Modulator with Strip-Loaded GaInAsP Planar Waveguide", Journal of Lightwave Technology, vol. LT-4, No. 10, Oct. 1986, pp. 1445-1453.
Bortfeld, "Analysis of Heterojunction Optical Waveguides with a Modulated Region Smaller than the Guide Width", IEEE Journal of Quantum Electronics, vol. QE-10, No. 7, Jul. 1974, pp. 551-556.

Primary Examiner—Eugene R. LaRoche
Assistant Examiner—Evelyn A. Lester
Attorney, Agent, or Firm—Staas & Halsey

[57] ABSTRACT

An optical intensity modulator includes a compound semiconductor substrate of a first conductivity type having first and second surfaces, and a compound semiconductor active layer of the first conductivity type formed on the first surface of the compound semiconductor substrate. An incident laser beam to be intensity-modulated is applied to the compound semiconductor active layer. The modulator further includes a compound semiconductor layer of the first conductivity type formed on the compound semiconductor active layer, an opposite conductivity type compound semiconductor layer of a second conductivity type opposite to the first conductivity type, a first electrode formed on the opposite conductivity type compound semiconductor layer, and a second electrode formed on the second surface of the compound semiconductor substrate.

12 Claims, 4 Drawing Sheets

OPTICAL INTENSITY MODULATOR

BACKGROUND OF THE INVENTION

The present invention generally relates to an optical intensity modulator, and more particularly to an improvement in an optical intensity modulator which modulates an incident laser beam on the basis of an electric field applied thereto.

Referring to FIG. 1, there is illustrated a conventional optical intensity modulator. The illustrated optical intensity modulator is made up of an $n^+$-type compound semiconductor substrate 1, an $n^-$-type active layer 2, a $p^+$-type compound semiconductor layer 3, an electrode 4 formed on a bottom surface of the $n^+$-type semiconductor substrate 1, and electrode 5 formed on a surface of the $p^+$-type semiconductor layer 3. An incident laser beam L emitted from a laser diode (not shown) is projected onto a first end surface of the optical intensity modulator. The incident laser beam L penetrates the active layer 2, which serves as a waveguide path. Then the penetrated laser beam is emitted from a second end surface of the optical intensity modulator which is opposite to the first end surface.

Generally, the width of the forbidden band in the active layer 2 is set 20–30 [meV] larger than an amount of energy of the incident laser beam L. When a reverse bias voltage is applied between the electrodes 4 and 5, the absorption edge in the active layer 2 expands toward the low energy side due to the Franz-keldish effect. Thus, the incident laser beam L is absorbed within the active layer 2, and no laser beam is emitted from the second end surface of the modulator. In this manner, the incident laser beam L is intensity-modulated by turning ON/OFF the reverse bias voltage to be applied to the pn junction between the $n^-$-type active layer 2 and the $p^+$-type semiconductor layer 3.

However, the conventional optical intensity modulator presents a disadvantage in that the incident laser beam L is somewhat absorbed in the active layer 2 even when the reverse bias voltage is turned OFF. This disadvantage will be understood with ease from a distribution of an electric field in the pn junction.

FIG. 2 is a graph illustrating a distribution of an electric field in the pn junction. The horizontal axis of the graph represents distance measured in the direction of thickness of each layer, and the vertical axis thereof represents intensity of the electric field [V/cm]. In FIG.2, the same reference numerals as those shown in FIG. 1 indicate the same elements shown in FIG.1. A solid line indicated b $V_0$ is a characteristic line which shows a distribution b of the electric field. The characteristic line relates to a case where the active layer 2 is 2000 [Å] thick. It can be seen from the graph that an electric field is being applied to the active layer 2 due to the presence of a diffusion voltage even when the reverse bias voltage is set equal to zero. This means that the absorption end in the active layer 2 expands toward the low energy side and thus the incident laser beam L is absorbed in the active layer 2. As a result, it is impossible to draw a laser beam having a sufficient power from the second end surface.

FIG.3 is a graph illustrating expansion of the absorption edge. The horizontal axis of the graph represents energy, and the vertical axis thereof represents an absorption coefficient. A solid line is a characteristic line obtained in the absence of electric field, and a broken line is a characteristic line obtained when the reverse bias voltage is applied between the electrodes 4 and 5. A reference letter $P_{AB}$ indicates the absorption edge in the active layer 2, and $\Delta E$ is the difference in energy between the absorption edge $P_{AB}$ and the incident laser beam L. It can be seen from the graph of FIG. 3 that intrinsically there is the definite energy difference $\Delta E$ between the absorption ed $P_{AB}$ and the incident laser beam L in the absence of electric field. Thus, it is expected that the incident laser beam L emitted from the modulator has an intensity identical to a design value. However, as described previously, the absorption edge $P_{AB}$ expands when a diffusion voltage exists in the active layer 2, and the incident laser beam L is absorbed and attenuated in the active layer 2.

In order to overcome the aforementioned shortcoming, it is conceivable to set the difference $\Delta E$ in energy between the absorption ed $P_{AB}$ and the incident laser beam L equal to or greater than about 50 [meV]. However, the above setting presents another disadvantage in that a change in the absorption coefficient obtained when the reverse bias voltage is applied is small.

SUMMARY OF THE INVENTION

Accordingly, a general object of the present invention is to provide an improved optical intensity modulator in which the aforementioned disadvantages are eliminated.

A more specific object of the present invention is to provide an improved optical intensity modulator in which the active layer is less influenced due to the diffusion voltage so that the absorption edge in the active layer is prevented from expanding.

Another object of the present invention is to provide an optical intensity modulator in which the incident laser beam is not absorbed in the active layer in the absence of electric field and a great change in the absorption coefficient is generated when the reverse bias voltage is applied.

The above objects of the present invention can be achieved with an optical intensity modulator comprising a compound semiconductor substrate of a first conductivity type having first and second surfaces, a compound semiconductor active layer of the first conductivity type formed on the first surface of the compound semiconductor substrate, a laser beam to be intensity-modulated is applied to the compound semiconductor active layer, a compound semiconductor layer of the first conductivity type formed on the compound semiconductor active layer, an opposite conductivity type compound semiconductor layer of a second conductivity type opposite to the first conductivity type, a first electrode formed on the opposite conductivity type compound semiconductor layer, and a second electrode formed on the second surface of the compound semiconductor substrate.

Additional objects, features and advantages of the present invention will become apparent from the following detailed description when read in conjunction with the accompanying drawings.

DESCRIPTION OF THE PREFERRED EMBODIMENTS

Figure 4:
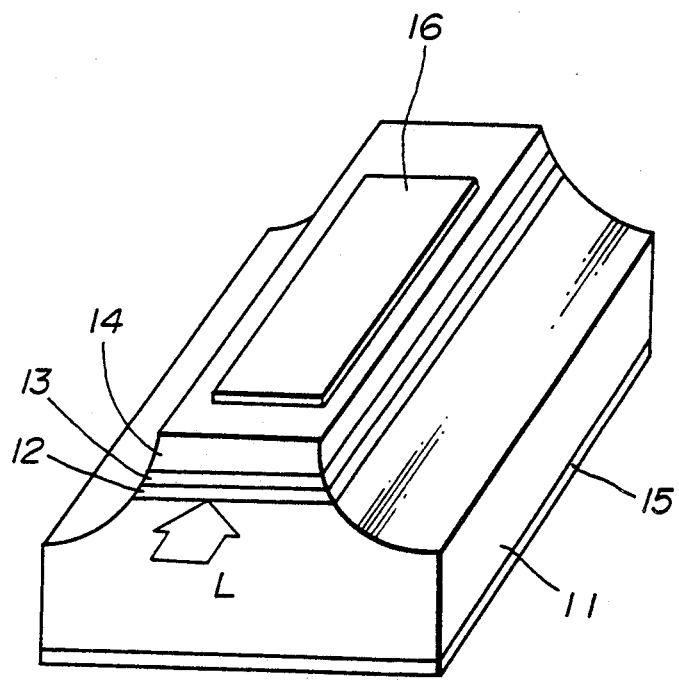
FIG. 4 is a perspective view of a preferred embodiment of the present invention.
Figure 5:
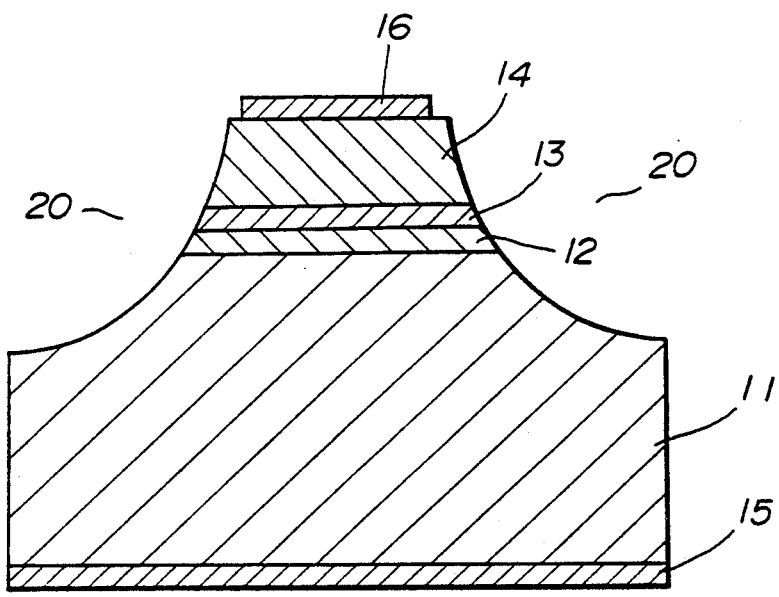
FIG. 5 is a cross sectional view taken along the line V—V shown in FIG. 4.

A description is given of a first preferred embodiment with reference to FIGS. 4 and 5. Referring to these figures, the illustrated optical intensity modulator is made up of an n+-type indium-phosphide (InP) substrate 11, an n−-type indium-gallium-arsenide-phosphide (InGaAsP) active layer 12, an n-type indium-phosphide (InP) layer 13, and a p+-type indium-phosphide (InP) layer 14, which are stacked in this order. An electrode 15 is formed on the bottom surface of the n+-type InP substrate 11, and an electrode 16 is formed on the top surface of the p+-type InP layer 14. An InP semi-insulator (not shown) may be formed in element-to-element insulating grooves 20 formed by etching. A plurality of optical intensity modulator may be formed on the n+-type InP substrate 11. The illustrated layer structure can be formed by use of a metalorganic vapor phase epitaxy liquid phase epitaxy (MOVPE) process or a liquid phase epitaxy (LPE) process, for example.

An essential feature of the present embodiment is the presence of the n-type InP layer 13, which is sandwiched between the p−-type InGaAsP active layer 12 and the p+-type InP layer 14. The conductivity of the n-type InP layer 13 is the same as that of the n−-type InGaAsP active layer 12 and opposite to that of the p+-type InP layer 14.

The following parameters apply for the layers 11–14, where d is an impurity density and t is a layer thickness;

A. n+-type InP substrate 11
 d: $1 \times 10^{18}$ [cm$^{-3}$]
B. n−-type InGaAsP active layer 12
 t: 0.2 [μm]
C. n-type InP layer 13
 t: 0.2 [μm]
D. p+-type InP layer 14
 t: 1 [μm]
 d: $1 \times 10^{18}$ [cm$^{-3}$]

The electrode 15 is formed by an AuGe/Au layer, and the electrode 16 is formed by a Ti/Pt/Au layer, for example.

Figure 6:
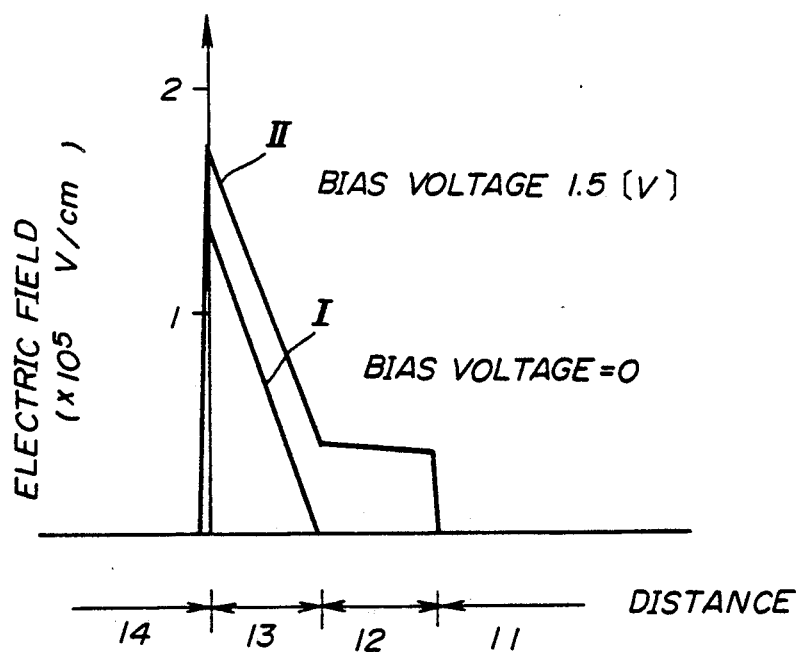
FIG. 6 is a graph illustrating distributions of electric field observed in the layer structure shown in FIG. 4.

FIG. 6 is a graph illustrating a distribution of electric field for the optical intensity modulator shown in FIGS. 4 and 5. In FIG. 6, those parts which are the same as those in FIGS. 4 and 5 are given the same reference numerals. The horizontal axis of the graph of FIG. 6 represents distance in the direction of thickness of each layer, and the vertical axis represents intensity of an electric field. A line I is a characteristic line obtained in the absence of the reverse bias voltage applied between the electrodes 15 and 16, and a line II is a characteristic line obtained when the reverse bias voltage is set equal to −1.5 [V].

The graph of FIG. 6 exhibits the following. It can be seen from the graph of FIG. 6 that the presence of the n-type InP layer 13 contributes to reducing the intensity of electric field in the active layer 12. That is, the intensity of the electric field in the n-type InP layer 13 gradually decreases toward the active layer 12, and is sufficiently reduced at an interface between the active layer 12 and the n-type INP layer 13. Preferably, the intensity of the electric field in the n-type InP layer 13 becomes zero at the interface between the active layer 12 and the n-type InP layer 13. In this case, no electric field is applied to the active layer 12 in the absence of the bias voltage, and on the other hand, the electric field is immediately applied to the active layer 12 when the reverse bias voltage is applied to the electrodes 15 and 16. As a result, it is possible to set the difference in energy between the absorption edge of the active layer 12 and the incident laser beam L equal to or less than 50 [meV] so that a large absorption coefficient can be obtained.

Figure 1:
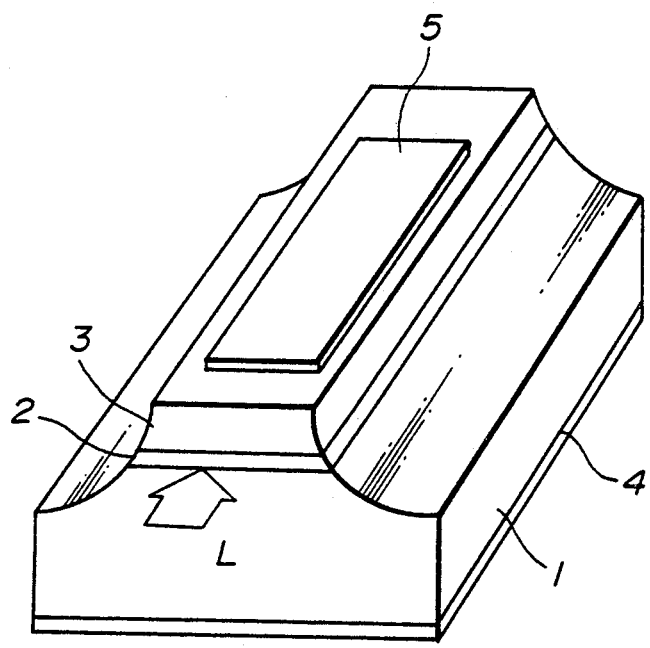
FIG. 1 is a perspective view of a conventional optical intensity modulator.
Figure 2:
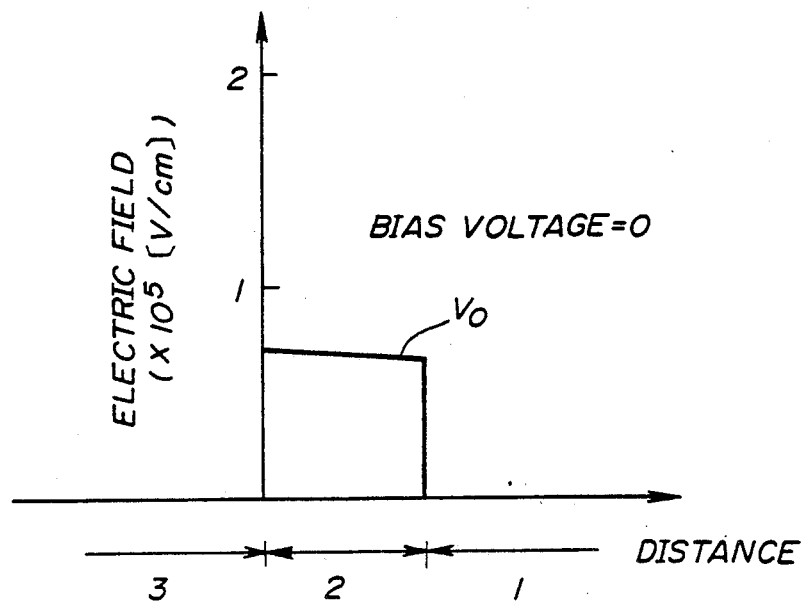
FIG. 2 is a graph illustrating a distribution of an electric field in a pn junction formed in the modulator shown in FIG. 1.
Figure 3:
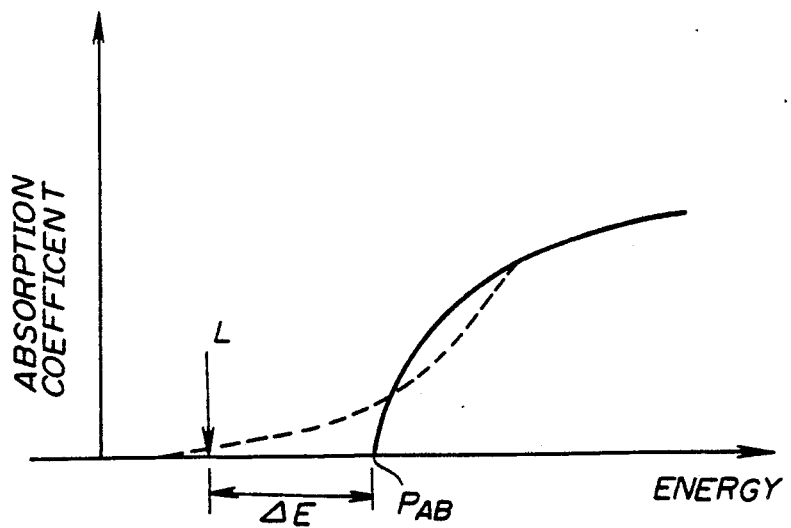
FIG. 3 is a graph illustrating an expansion of an absorption edge in an active layer of the modulator.

The incident laser beam L is emitted from a laser diode (not shown), which has a p+-type InP/n-type InGaAsP/n−-type InP layer structure in a similar manner to the structure shown in FIG. 1. The laser beam L emitted from the above laser diode has a wavelength of 1.55 [μm] and a power up to 20 [mV]. The n-type InGaAsP active layer of the laser diode is 1500 [Å], for example. According to the experiments in which the above-mentioned laser diode was used, the power of the output laser beam emitted from the modulator is 15 [mW] when the absorption edge is 1.40 [μm], and the power of the output laser beam is 8 [mW] when the absorption edge is 1.43 [μm]. Generally, a necessary power of the incident laser beam L is equal to or larger than 10 [mW]. From this viewpoint, it is necessary to separate the absorption edge from the wavelength of the laser beam by about 1.40 [μm].

The relation between the width and carrier density of the n-type InP layer 13 is written as follows:

$$d = [[(2 \cdot \epsilon_r \cdot \epsilon_0)/(e \cdot Nd)] \cdot Vd]^{\frac{1}{2}}$$

where d is the width of the n-type InP layer 13, $\epsilon_r$ is the relative permittivity, $\epsilon_0$ is the permittivity, e is the charge of electron, Nd is the carrier density, and Vd is the diffusion potential. The carrier density Nd functions to change the gradient of the intensity of electric field in the n-type InP layer 13. When a gradient of the intensity of electric field in the n-type InP layer 13 is selected, the thickness thereof is determined so that the intensity of electric field at the interface between the layers 12 and 13 is sufficiently reduced, preferably, zero. It is preferable that the n-type InP layer 13 is designed to satisfy the above-identified formula.

Alternatively, it is possible to replace InP and InGaAsP by AlInP and AlGaInAs, respectively. Further, each of the layers 11, 12, 13 and 14 may have the conductivity opposite to the aforementioned respective conductivity. That is, the layers 11, 12, 13 and 14 are formed of p+-type InP, p−-type InGaAsP, p-type InP and n+-type InP, respectively.

Alternatively, the active layer 12 can be formed by a multi-quantum well structure. A pair of an InP layer and an InGaAsP layer is successively grown for a predetermined number of times by MOVPE, for example. Each of the InP layer and the InGaAsP layer is 100 [Å] thick, for example. When the InP/InGaAsP stacked layer is grown ten times, the active layer 12 is 0.2 [μm].

The mole fraction x and y for $In_{1-x}Ga_xAs_yP_{1-y}$ are set as follows:

x = 0.47y
y = 0.9.

The laser diode and the optical intensity modulator may have different substrates, and alternatively may be formed on the same substrate (monolithically integrated). In the alternative, the laser diode is located close to the optical intensity modulator so that all laser beams emitted from the laser diode enters the active layer 12, or in other words, the diameter of the laser beam measured on the active layer 12 is equal to or larger than the thickness of the active layer 12.

In a variation of the structure shown in FIG. 5, the electrodes 15 and 16 may be formed on respective contact layers formed on the n+-type InP substrate 11 and the p+-type InP layer 14.

The present invention is not limited to the aforementioned embodiments, and variation and modifications may be made without departing from the scope of the present invention.

What is claimed is:

1. An optical intensity modulator comprising:
  a compound semiconductor substrate of a first conductivity type having first and second surfaces;
  a compound semiconductor active layer of the first conductivity type formed on said first surface of the compound semiconductor substrate, an incident laser beam to be intensity-modulated being applied to said compound semiconductor active layer;
  a compound semiconductor layer of the first conductivity type formed on said compound semiconductor active layer, wherein said compound semiconductor layer satisfies the following formula:

$$d = [[(2 \cdot Er \cdot Eo)/(e \cdot Nd)] \cdot Vd]^{\frac{1}{2}}$$

where d is the width of said compound semiconductor layer, Er is the relative permittivity thereof, Eo is the permittivity thereof, e is the charge of electron, Nd is the carrier density thereof, and Vd is the diffusion potential;
  an opposite conductivity type compound semiconductor layer of a second conductivity type opposite to the first conductivity type, said opposite conductivity type compound semiconductor layer being formed on said compound semiconductor layer;
  a first electrode formed on said opposite conductivity type compound semiconductor layer; and
  a second electrode formed on said second surface of the compound semiconductor substrate.

2. An optical intensity modulator as claimed in claim 1, wherein said compound semiconductor active layer is a single layer of the first conductivity type.

3. An optical intensity modulator as claimed in claim 1, wherein said compound semiconductor active layer has a multi-quantum layer structure.

4. An optical intensity modulator as claimed in claim 3, wherein said multi-quantum well layer structure of said compound semiconductor active layer comprises a plurality of stacked layers each including a first compound semiconductor layer and a second compound semiconductor layer.

5. An optical intensity modulator as claimed in claim 4, wherein said first compound semiconductor layer contains indium-phosphide and said second compound semiconductor layer contains indium-gallium-arsenide-phosphide.

6. An optical intensity modulator as claimed in claim 1, wherein said compound semiconductor substrate is an n+-type indium-phosphide substrate, said compound semiconductor active layer is an n−-type indium-gallium-arsenide-phosphide, said compound semiconductor layer is an n-type indium-phosphide layer, and said opposite conductivity type compound semiconductor layer is a p+-type indium-phosphide.

7. An optical intensity modulator as claimed in claim 1, wherein said compound semiconductor substrate is a p+-type indium-phosphide substrate, said compound semiconductor active layer is a p−-type indium-gallium-arsenide-phosphide, said compound semiconductor layer is a p-type indium-phosphide layer, and said opposite conductivity type compound semiconductor layer is an n+-type indium-phosphide.

8. An optical intensity modulator as claimed in claim 1, wherein the difference in energy between an absorption edge in said active layer and said applied laser beam is equal to or less than 50 [meV].

9. An optical intensity modulator as claimed in claim 1, wherein a bias voltage for intensity modulation is applied between said first and second electrodes.

10. An optical intensity modulator as claimed in claim 1, wherein the intensity of an electric field in the compound semiconductor layer gradually decreases toward said compound semiconductor active layer.

11. An optical intensity modulator as claimed in claim 10, wherein the intensity of the electric field is zero at an interface between said compound semiconductor active layer and said compound semiconductor layer in the absence of a bias voltage applied between said first and second electrodes.

12. An optical intensity modulator as claimed in claim 10, wherein an electric field necessary for intensity modulation is applied to an interface between said compound semiconductor active layer and said compound semiconductor layer when a reverse bias voltage is applied between said first and second electrodes.

* * * * *

UNITED STATES PATENT AND TRADEMARK OFFICE
CERTIFICATE OF CORRECTION

PATENT NO. : 5,113,283
DATED : May 12, 1992
INVENTOR(S) : Mitsuru Sugawara

It is certified that error appears in the above-identified patent and that said Letters Patent is hereby corrected as shown below:

Column 1, line 30, delete "keldish" and insert --Keldysh--; and
        line 52, delete "b" and insert --by--.

Column 2, line 8, delete "ed" and insert --edge--; and
        line 18, delete "ed" and insert --edge--.

Column 3, line 32, delete "p$^-$-type" and insert --n$^-$-type--.

Column 4, line 2, delete "INP" and insert --InP--.

Column 5, line 4, delete "enters" and insert --enter--.

Signed and Sealed this

Fourteenth Day of December, 1993

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO.   :   5,113,283
DATED        :   May 12, 1992
INVENTOR(S)  :   SUGAWARA

It is certified that error appears in the above-indentified patent and that said Letters Patent is hereby corrected as shown below:

Cover page, item [73] Assignee:, after "Fujitsu" insert --Limited--.

Signed and Sealed this

Nineteenth Day of July, 1994

Attest:

BRUCE LEHMAN

Attesting Officer      Commissioner of Patents and Trademarks